May 5, 1925. 1,536,849
P. O. HELLER
DRAFT EQUALIZER
Filed Jan. 22, 1924
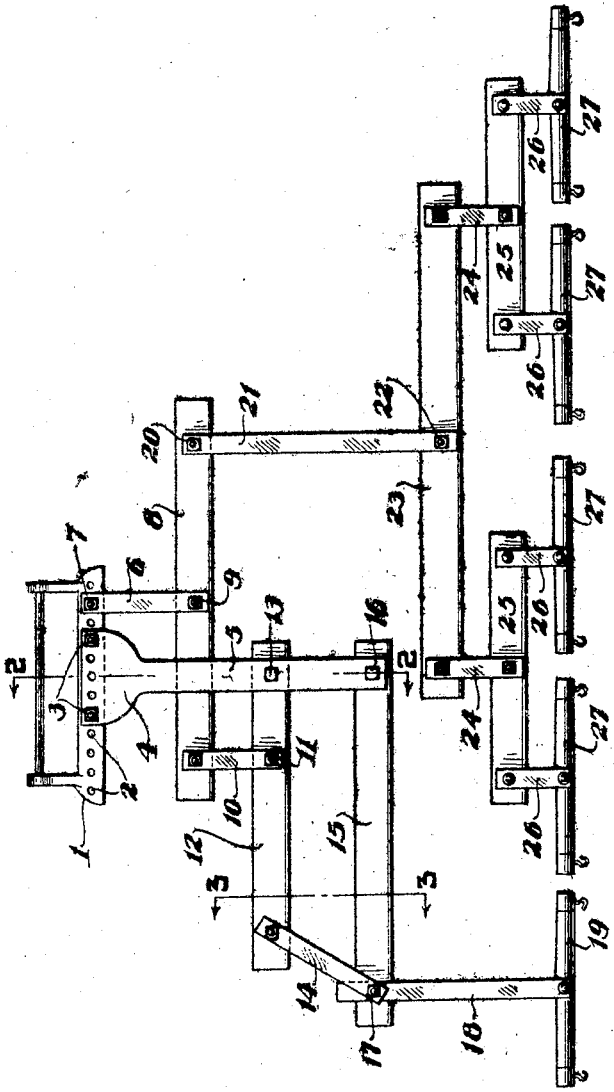
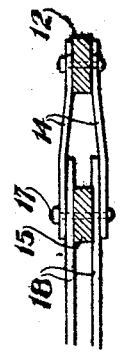
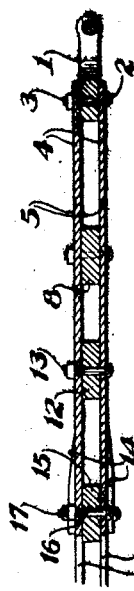
Perry O. Heller
INVENTOR
WITNESSES
Louis Goodman
Howard D. Orr
BY
ATTORNEY Patented May 5, 1925.

1,536,849

UNITED STATES PATENT OFFICE.

PERRY OSCAR HELLER, OF PROPHETSTOWN, ILLINOIS.

DRAFT EQUALIZER.

Application filed January 22, 1924. Serial No. 687,810.

*To all whom it may concern:*

Be it known that I, PERRY O. HELLER, a citizen of the United States, residing at Prophetstown, in the county of Whiteside and State of Illinois, have invented new and useful Improvements in Draft Equalizers, of which the following is a specification.

This invention relates to draft equalizers, and is designed as an improvement on the draft equalizer shown and described in Patent No. 1,429,425, issued to me on September 19, 1922, wherein is shown an equalizing device which may be converted from a four to a five horse equalizer.

The object is to provide a draft equalizer for use in connection with five draft animals for operating a "double bottom" or gang plow throwing two furrows, and to enable one animal to traverse the last furrow plowed while the remaining four may walk on the unplowed ground, each animal walking straight ahead with no tendency to travel sideways.

Another object is to equalize the draft of the several animals, and at the same time to exert a tendency on the head or front of the plow to point into the unplowed ground.

A full and complete understanding of the invention may be obtained from a consideration of the following detailed description taken in connection with the accompanying drawing forming a part of this specification; it being understood that while the drawing shows a practical form of the invention, the latter is not to be confined to strict conformity with the showing thereof but may be changed or modified, so long as such changes or modifications mark no material departure from the salient features of the invention, as specifically pointed out in the appended claims.

In the drawing, in which similar reference characters designate corresponding parts throughout the several figures:—

Figure 1 is a plan view of the invention;

Figure 2 is a detail section taken on the line 2—2 of Figure 1;

Figure 3 is a similar view taken on the line 3—3 of Figure 1.

Referring to the drawing, there is shown a clevis 1 which is horizontally disposed and of the kind generally used on a double plow in order to adjust the hitch horizontally for imparting the proper pull on each plow. The clevis is provided with a series of apertures 2 arranged transversely of the line of draft and adapted to receive spaced bolts 3 for securing the enlarged heads 4 of a pair of draw bars 5 extending forwardly from the clevis or longitudinally of the line of draft, said bars being in the form of metallic plates located one on top of the clevis and the other beneath the same, as clearly shown in Figure 2 of the drawing.

A pair of strap irons or links 6 are pivotally connected to the clevis 1 at one side of the draw bars 5 by a bolt 7, said links extending forwardly and substantially parallel with the bars 5 for a distance substantially one-third the length of the latter, and have an evener bar 8, preferably formed of wood, centrally pivoted between the forward ends thereof by a bolt 9.

One end of the evener bar 8 extends between the draw bars 5 and beyond the same and towards the plowed ground, the same being free to rock about its pivot 9 and to permit the links 6 to swing to the right or the left. This end of the evener bar 8 is pivotally connected to a pair of longitudinally disposed relatively short links 10 extending forwardly and also substantially parallel to the draw bars, the links 10 and the links 6 being substantially the same distance from the center line of said draw bars.

The forward ends of the links 10 are pivotally connected by a bolt 11 to an equalizer beam 12, arranged substantially parallel to the aforesaid evener bar 8 and in advance of the same, the inner end of the beam 12 being pivotally connected between the draw bars 5 by a vertical bolt 13. The outer end of the equalizer beam 12 is considerably longer than the inner end thereof and is connected by a pair of forwardly and outwardly extending inclined links 14 to the outer end of a spreader bar 15, which is somewhat longer than the equalizer beam 12 and is pivotally connected at its inner end, between the forward ends of the draw bars 5, by a bolt 16. The angularly disposed links 14 are pivotally connected to the said spreader bar 15 by a bolt 17, which also serves to pivotally connect the rear ends of a pair of elongated strap irons or links 18, between the front ends of which there is mounted, in the usual manner, a single tree 19, which serves for the hitching of a single horse, which is adapted to walk in the last furrow plowed.

The outer end of the evener bar 8, or that end remote from the draw bars, is pivotally connected, by a bolt 20, to the rear ends of elongated links 21, the forward ends of the same extending beyond the front ends of the draw bars 5 and normally lying parallel to the same. The links 10 and 21 are connected to the evener bar 8 at points substantially equidistant from the central bolt 9, and the increased power applied to the inner end of said evener bar 8 by the draft of the single horse hitched to the single-tree 19, through the manner of pivoting the equalizer beam 12 and the point of connection of the links 10 to said beam 12, requires that an excess of power or draft be applied to the outer end of said evener bar 8. To this end, the front ends of the elongated links 21 are centrally pivoted, by a bolt 22, to a four-horse evener bar 23, formed, like the members 8, 12 and 15, of suitable wood and arranged parallel to the same or transversely of the line of draft, the said four-horse evener being located in advance of the spreader 15 and the front ends of the draw bars 5.

At points equidistant from the bolt 22, the evener 22 is pivotally connected to the rear ends of links 24 which, in turn, are centrally pivoted to double trees 25, having links 26 connected to their ends, and in turn carrying single trees 27 for connection to four horses, which are in a position to walk on the unplowed ground.

By reason of the leverage supplied by the manner of connecting the equalizer 12, the draft of the horse hitched to the singletree 19 equalizes the draft of the four horses hitched to the singletrees 27, and while a tendency is imparted to the fronts of the plows to be directed into the unplowed ground, all the animals are permitted to walk in a straight path thus eliminating the side pull usually encountered in the use of such draft equalizers.

The action of the spreader bar 15, when draft is applied to the singletree 19, is to push laterally on the front ends of the draw bars 5 towards the unplowed ground, by reason of the inclination of the links 14 and since the draw bars 5 are rigidly connected to the clevis 1, such tendency is imparted to the plows, and in this manner the side draft is eliminated and the animals may walk straight ahead in doing their work.

From the foregoing it will be seen that a simple, cheaply-manufactured, strong and durable equalizer has been provided which will equalize the draft of five horses, permitting one thereof to walk in the last furrow while the remainder walk upon the unplowed ground, and to enable all of the horses to follow a straight path without any side pull, the plows being constantly directed into the unplowed ground by the pull of the single horse occupying the furrow.

What is claimed is:—

1. The combination with a pair of draw bars having means at their inner ends for connection to a plow clevis, a pair of links pivotally connected to the plow clevis at one side of the draw bars, a rear evener bar pivotally connected at an intermediate point of its length to the front ends of said links and extending between the draw bars to the other side of the latter, a transverse equalizer beam pivoted at its inner end to the draw bar in advance of the said evener bar, means for pivotally connecting the equalizer beam to the said extended end of the said evener bar, a spreader bar pivotally connected at its inner end to the front end of the draw bars, means for pivotally connecting the outer end of the spreader bar to the outer end of the equalizer beam, means for connecting a singletree to the outer end of the spreader bar, said singletree being arranged to cause the horse to travel in the plow furrow, links connected to the other end of said rear evener bar, a four-horse evener bar connected to the last-mentioned links and arranged in advance of the draw bars, and singletrees for four horses connected to said four-horse evener bar, two singletrees being located at opposite sides of the connection of the last-mentioned links to said four-horse evener, so that the four horses may travel the unplowed ground.

2. In a draft equalizer, the combination of a longitudinal draw bar having means of connection to a clevis, a link connection with the clevis at one side of the draw bar, a rear transverse evener bar intermediately connected to the forward ends of said link connection, the inner end of said bar extending beyond the other side of the draw bar, a second link connection with said inner end and extending forwardly, a transverse equalizer beam pivoted at its inner end to the draw bar in advance of the said evener bar and connected adjacent to its pivoted end to the front end of the second link connection, a transverse spreader bar pivoted at its inner end to the front end of the draw bar and in advance of the equalizer beam and extending outwardly beyond the same, an angularly-disposed, outwardly-extending link connection between the outer end of the equalizer beam and the spreader bar, longitudinal links connected to the outer end of the spreader bar and having a singletree connected to their front ends, elongated longitudinal links connected to the outer end of the said evener bar and connected to a four-horse evener bar in advance of the front end of the draw bar, doubletrees connected to the ends of the four-horse evener, and a singletree at each end of each doubletree.

In testimony that I claim the foregoing as my own, I have hereto affixed my signature.

PERRY OSCAR HELLER.